(12) United States Patent
Pinter et al.

(10) Patent No.: US 11,546,684 B2
(45) Date of Patent: Jan. 3, 2023

(54) EAR CUSHION ASSEMBLY

(71) Applicant: AUSTRIAN AUDIO GMBH, Vienna (AT)

(72) Inventors: Bernhard Pinter, Moosbrunn (AT); Patrice Billaudet, Vienna (AT); Philipp Schuster, Vienna (AT)

(73) Assignee: AUSTRIAN AUDIO GMBH, Vienna (AT)

( * ) Notice: Subject to any disclaimer, the term of this patent is extended or adjusted under 35 U.S.C. 154(b) by 0 days.

(21) Appl. No.: 17/387,116

(22) Filed: Jul. 28, 2021

(65) Prior Publication Data

US 2022/0046350 A1 Feb. 10, 2022

(30) Foreign Application Priority Data

Aug. 4, 2020 (EP) ..................................... 20189376

(51) Int. Cl.
*H04R 25/00* (2006.01)
*H04R 1/10* (2006.01)
(52) U.S. Cl.
CPC ......... *H04R 1/1008* (2013.01); *H04R 1/1066* (2013.01)
(58) Field of Classification Search
CPC .. H04R 1/2807; H04R 1/2823; H04R 1/2849; H04R 9/025
See application file for complete search history.

(56) References Cited

U.S. PATENT DOCUMENTS

| 4,654,898 | A | | 4/1987 | Ishikawa | |
|---|---|---|---|---|---|
| 5,497,427 | A | * | 3/1996 | Nageno | H04R 1/1066 381/381 |
| 2007/0094771 | A1 | | 5/2007 | Chen | |
| 2011/0116674 | A1 | * | 5/2011 | Asakura | H04R 1/1066 381/378 |
| 2013/0077800 | A1 | * | 3/2013 | Pan | H04R 1/2811 381/74 |

FOREIGN PATENT DOCUMENTS

| EP | 0084363 A1 | 7/1983 |
|---|---|---|
| JP | 5131097 B2 | 1/2013 |

* cited by examiner

*Primary Examiner* — Amir H Etesam
(74) *Attorney, Agent, or Firm* — Raven Patents, LLC; Anton E Skaugset

(57) ABSTRACT

Ear cushion assemblies, and headphones incorporating ear cushion assemblies, the ear cushion assembly including an ear cushion coupled to a mounting plate, where the mounting plate defines plural openings for a passage of sound, and defines plural openings for fasteners; and where the ear cushion grips an outer circumference of the mounting plate to form an annular, circumferentially-fixed, and substantially airtight sealing surface.

14 Claims, 5 Drawing Sheets

EAR CUSHION ASSEMBLY

TECHNICAL FIELD

This disclosure relates to headphones and headsets, and in particular to ear cushion assemblies for use with a headphone or headset.

BACKGROUND

U.S. Pat. No. 4,654,898 describes a flat, flexible cushion attached to a small-format earpiece housing a transducer (i.e. speaker) with the aid of a hook-and-loop closure strip firmly attached to the cushion. The cushion has three "sides"; the middle one with a fitting hole is placed on the ear-facing side of the earpiece housing, and the other two are folded around the earpiece housing and attached with the hook-and-loop closure strip. The acoustics obtained in this way are completely undefined, the fit on the earpiece housing is problematic (as is the wearing comfort), and the lifespan is short.

Usually, the (two) cushions of a headphone are either fixed on the housings of the earpieces, or they are mounted by means of an elastic element, such as a rubber ring, etc., in a groove or behind corresponding projections on the earpiece housing. An example of a design in which the headphone cushions are mounted in a groove by means of an elastic element is described in US 2013/0077800. The fixed mounting of the cushion on the headphones has the disadvantage that, given the inevitable amount of wear and tear, the overall service life of the headphones will be determined by the most mechanically sensitive and most stressed part. Forcing it on, in the style of US 2013/0077800, is acoustically unsatisfactory due to the lack of sealing around the cushion, and it is usually also optically suboptimal.

Another publication in this area is JP 5131097, where an ear cushion ring is screwed between two ring-shaped elements, the outer of the two rings being positively connected to a transducer carrier plate. Although this enables the headphone cushion to be replaced, there is also an undefined seal between the transducer carrier plate and the upholstery, with the effect that this solution, too, is both visually and acoustically unsatisfactory.

There is thus a need for an easily removable and replaceable ear cushion assembly that can be mechanically, acoustically, and (preferably) also visually satisfactorily mounted on the earpiece or its housing.

SUMMARY

The present disclosure is directed to ear cushion assemblies, and headphones incorporating those ear cushion assemblies.

The present disclosure can include an ear cushion assembly having an ear cushion coupled to a mounting plate, where the mounting plate defines plural openings for the passage of sound, and plural openings for fasteners; where the ear cushion grips an outer circumference of the mounting plate to form an annular, circumferentially-fixed, and substantially airtight sealing surface.

The present disclosure can include headphones having an earpiece assembly that includes an ear cushion coupled to a mounting plate, and an earpiece housing. The mounting plate of the earpiece assembly defines openings for a passage of sound, and openings for screws, and the ear cushion grips an outer circumference of the mounting plate to form an annular, circumferentially-fixed, and substantially airtight sealing surface in this area. The earpiece housing includes a counter-sealing surface formed on the earpiece housing that forms a circumferential annular seal with the sealing surface of the ear cushion. The ear cushion assembly is connected to the earpiece housing by means of at least one screw that extends through a screw opening and is screwed into an internal threading of the earpiece housing.

The disclosed features, functions, and advantages of the disclosed earpiece assemblies and headphones may be achieved independently in various embodiments of the present disclosure, or may be combined in yet other embodiments, further details of which can be seen with reference to the following description and drawings.

DETAILED DESCRIPTION

Figure 1:
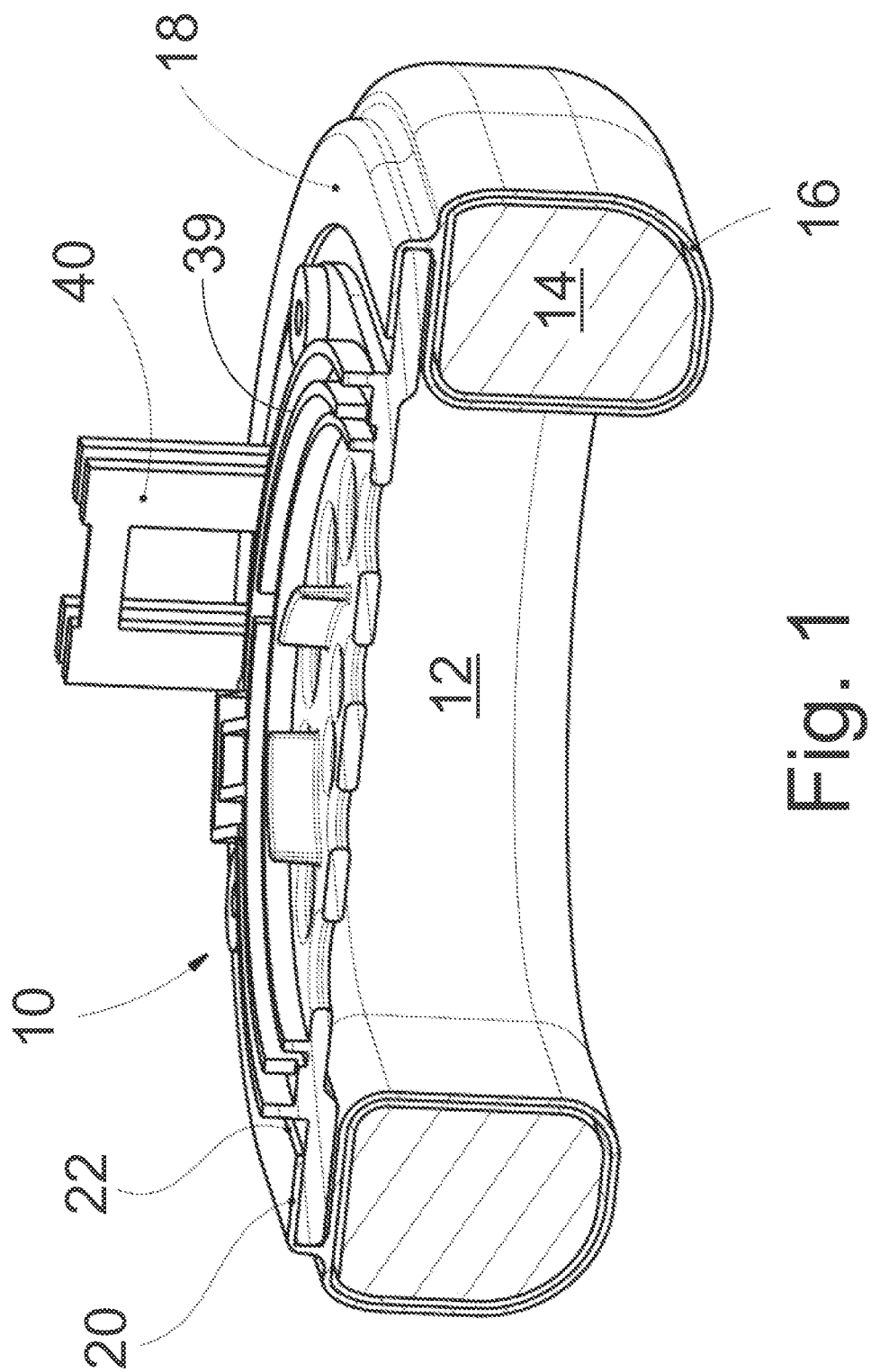
FIG. 1 is a sectional view of an exemplary ear cushion assembly according to the present disclosure.

A "headphone," "headphones," or "pair of headphones" as used herein typically include a pair of earpieces (including speakers) positioned over or adjacent to each ear of their user by a band worn on the head. A "headset" typically further includes an attached microphone to enable two-way communication. For the purposes of the present disclosure the terms "headphone" and "headset" may be used interchangeably.

A headphone typically includes two earpieces, each earpiece including an earpiece cushion assembly that is attached to or mounted upon an earpiece housing. The two earpiece housings may then be coupled by the band of the headphones. Each earpiece typically includes a transducer, or speaker.

The presently disclosed ear cushion assemblies can be readily mounted to, and removed from, a corresponding headphone earpiece. In addition, they can provide enhanced acoustic performance due to the creation of an excellent acoustic seal between the ear cushion assembly and the earpiece housing. These characteristics can be achieved because the construction of the disclosed ear cushion assemblies includes an ear cushion having a closed, circumferential, annular sealing surface along the periphery of the ear cushion. The ear cushion is firmly and tightly connected to a mounting plate, where the mounting plate includes openings for the passage of sound and at least two, preferably several, through-holes permitting fasteners to be used to secure the ear cushion assembly to an earpiece housing. The headphone earpiece or earpiece housing has a counter-sealing surface that is complementary in shape to the sealing surface of the ear cushion, and apertures corresponding in number and position to the through holes of the mounting plate for receiving the appropriate fasteners.

Thus, according to the present disclosure, an easily detachable and, by virtue of the sealing surface, airtight assembly is achieved, since the mostly unavoidable seam of the cushion cover (typically made of leather or synthetic leather) can be arranged in a section that is covered during assembly, and is therefore invisible after assembly is complete. It should be noted that the sealing surface between the cushion and the mounting plate is actually airtight at the time of assembly. The creeping and deformation processes of the cushion or cushion's outer material can result in minimal gaps during the service life, which might allow minimal exchange of air, but still ensure a tight and secure fit and are acoustically insignificant. Statistically significant changes in the tone curve that arise in a comparison with a reference receiver produced according to the present invention, glued airtight to the sealing surface and occurring in a range that is below the hearing threshold, are understood to be acoustically insignificant. ISO 28961:2012, in conjunction with ISO 226:2003, is used as a reference for the hearing threshold.

Additional refinements to the presently disclosed ear cushion assemblies may include the provision of guides that make it easier to achieve the correct relative position during assembly, and the arrangement of the screws in recesses that are constructed so as to be made invisible after assembly by means of optically pleasant plugs, and other details.

It should be noted that the exemplary ear cushion assemblies and earpiece housings of FIGS. 1-5 depict only those parts of a headphone that are necessary for the understanding of the present disclosure: The ear cushion assembly and the portion of the earpiece housing on which it can be mounted. Additional parts of the headphone, such as the transducer or speaker, the headband, the means of data transmission, etc., are not critical to the understanding of the disclosure, and are additionally well-understood in the art, and are therefore not shown or described to avoid excess verbosity.

FIG. 1 provides a sectional view of an ear cushion assembly 10 according to the present disclosure. Ear cushion assembly 10 includes at least one ear cushion 12 that in turn includes ear cushion padding 14, a shell or ear cushion cover 16 for ear cushion 12, and a mounting plate 24. In one embodiment of the disclosure, ear cushion 12 grips an outer circumference of mounting plate 24 in such a way as to form an annular, circumferentially-fixed, and substantially airtight sealing surface 18. Annular sealing surface 18 can be formed on, or as, a type of inwardly-extending annular flap 20, as shown in FIG. 1. Mounting plate 24 can be held in position on ear cushion assembly 10 by sealing surface 18, or more precisely by the design of the annular flap 20 formed on ear cushion cover 16 of ear cushion 12.

If suitable materials and manufacturing processes are used, such as for example a foam material, ear cushion cover 16 can be formed by the "skin" of the selected ear cushion padding 14. However, it is also possible to cover selected ear cushion padding 14 with a plastic film or with leather. In this instance ear cushion cover 16 can be glued on or, as with leather, can be closed up so as to fit tightly (i.e. provide a snug fit) around ear cushion padding 14 by creating a seam 22. Seam 22 can be advantageously positioned so that it is provided at an innermost edge of the inwardly-extending annular flap (see FIG. 3), that is, at an inner edge of sealing surface 18.

Figure 2:
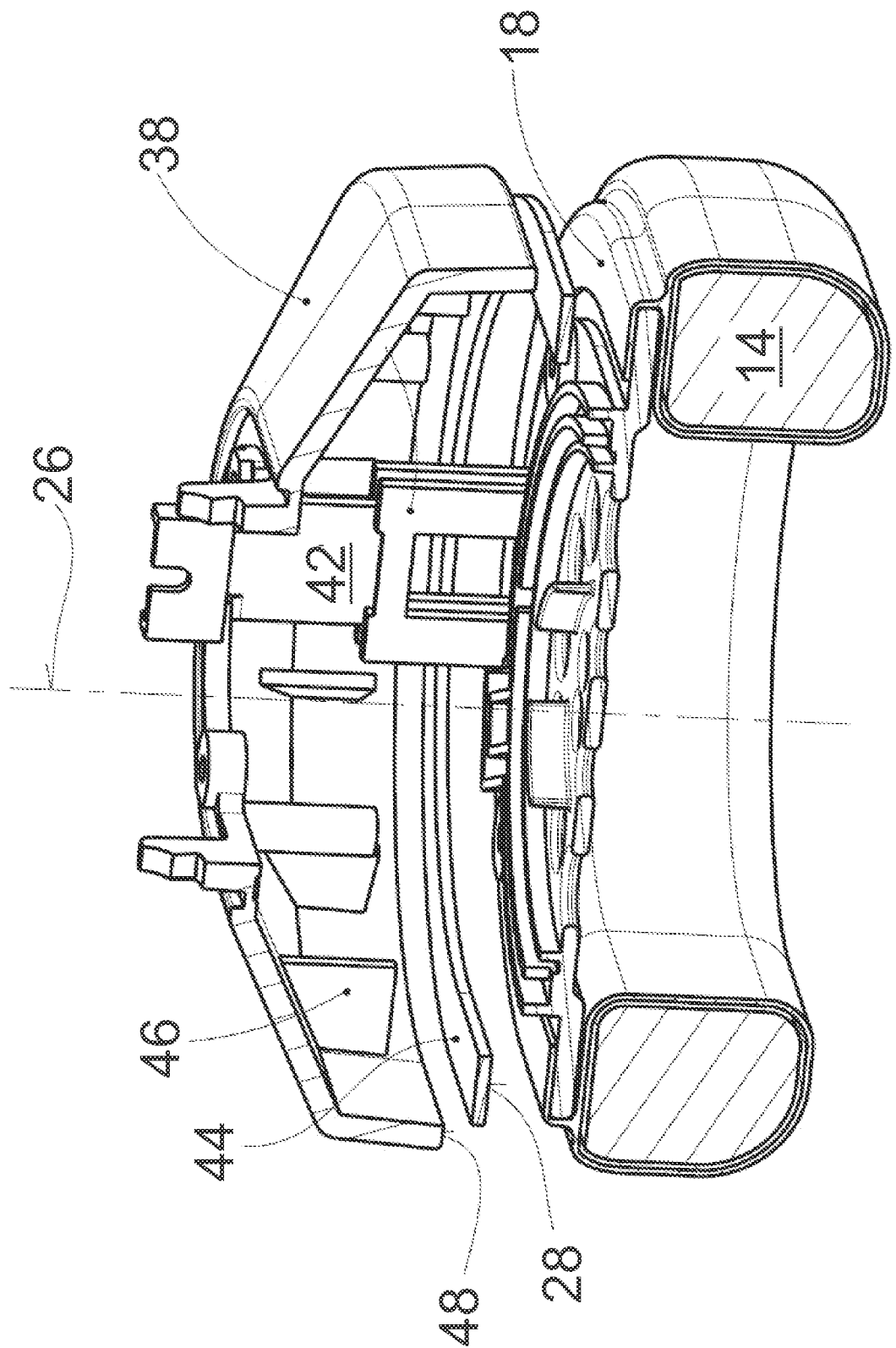
FIG. 2 is a sectional view of the ear cushion assembly of FIG. 1 assembled on a housing of an earpiece having a sealing ring.

Ring-shaped sealing surface 18 can, depending on the type of ear cushion 12 used, be part of ear cushion cover 16, or be glued to ear cushion cover 16, or molded onto it (or vice versa, i.e. the cushion padding and/or cushion filling can be part of, glued to, or molded onto the sealing surface). If sealing surface 18 is a separate part, it can preferably include pore-free plastic, natural or synthetic leather, or metal, among other materials. Sealing surface 18 is shown in the drawing as defining a plane that is oriented orthogonally to an axis 26 of the earpiece (as shown in FIG. 2), which is favorable for production, especially with respect to forming the ear cushion cover 16 and a counter-sealing surface 28 (see FIG. 2). Alternatively, a step can be formed in sealing surface 18 that, in combination with a corresponding design of counter-sealing surface 28 (FIG. 2), can ensure an accuracy of fit when in an assembled state. In another embodiment, annular sealing surface 18 can extend at least approximately parallel to axis 26, or at least approximately conically with respect to axis 26. That is, sealing surface 18 can formally define or be superimposed upon a portion of a cylinder or a cone that is not necessarily an upright and/or perfectly circular cylinder/circular cone.

In order to facilitate assembly and/or disassembly of the ear cushion, mounting plate 24 can include at least one essentially radially extending slot at at least one point into which sealing surface 18 can be inserted so that sealing surface 18 can be gradually pulled over mounting plate 24, until the sealing surface ultimately comes out of the slot and over it. Optionally, ear cushion 12 itself includes sealing surface 18, and can be made of at least partially elastic material, whereby a slot for putting ear cushion 12 on mounting plate 24 is not absolutely necessary, because ear cushion 12 returns to substantially its original dimension after being pulled over and snugly surrounding mounting plate 24.

Figure 5:
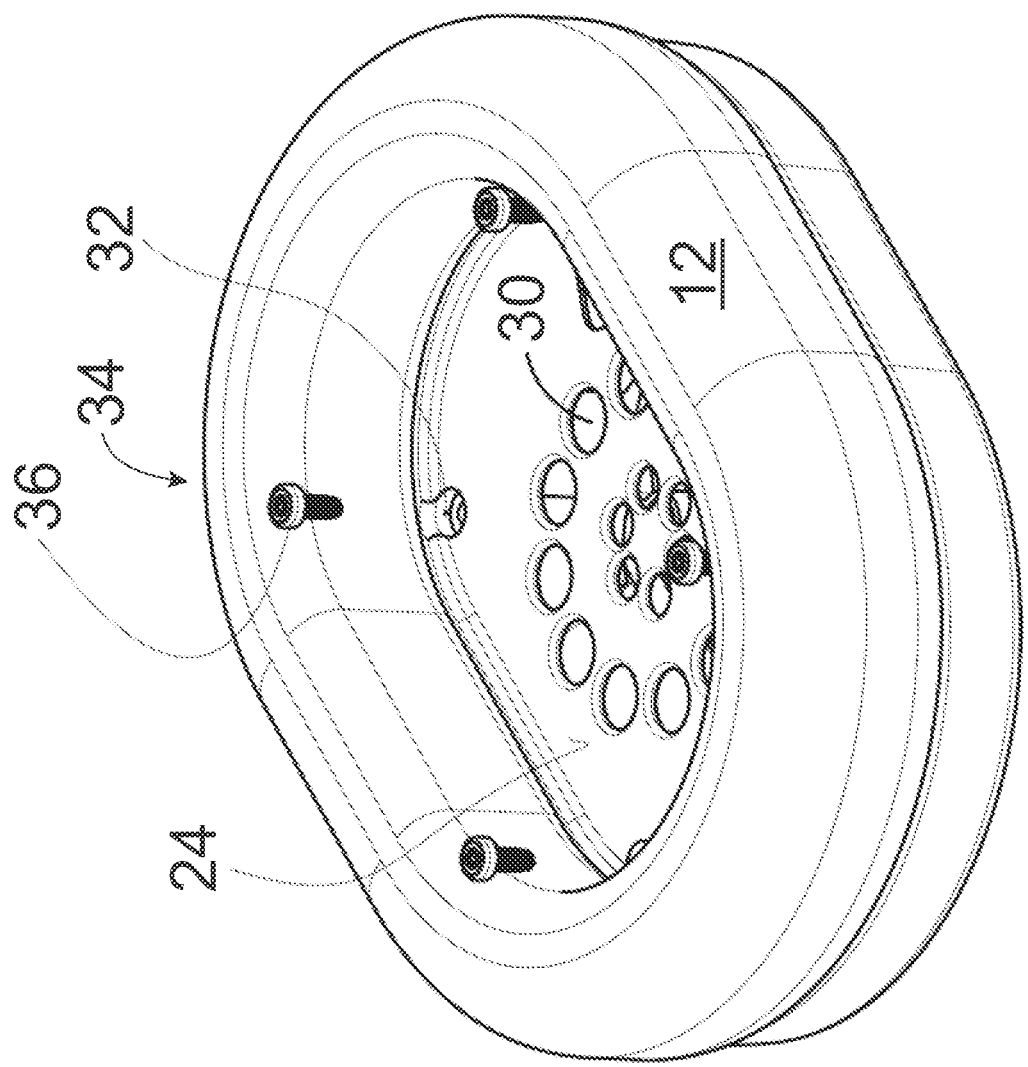
FIG. 5 depicts an exemplary ear cushion assembly according to the present disclosure, showing the fastening screws in a partially exploded view.

Mounting plate 24 (see FIG. 5) can define a plurality of acoustic openings 30 to permit the passage of sound, as well as a plurality of fastener openings 32 to permit the insertion of selected fasteners 34, such as for example screws 36, from the outside and into an earpiece housing 38 (as shown in FIG. 5). Mounting plate 24 can optionally and additionally include one or more features that serve to stiffen, structurally reinforce, and or increase the mechanical strength of mounting plate 24. For example mounting plate 24 can include one or more projecting ridges 39 formed on the interior surface of mounting plate 24, as shown in particular in FIGS. 1 and 3.

Figure 4:
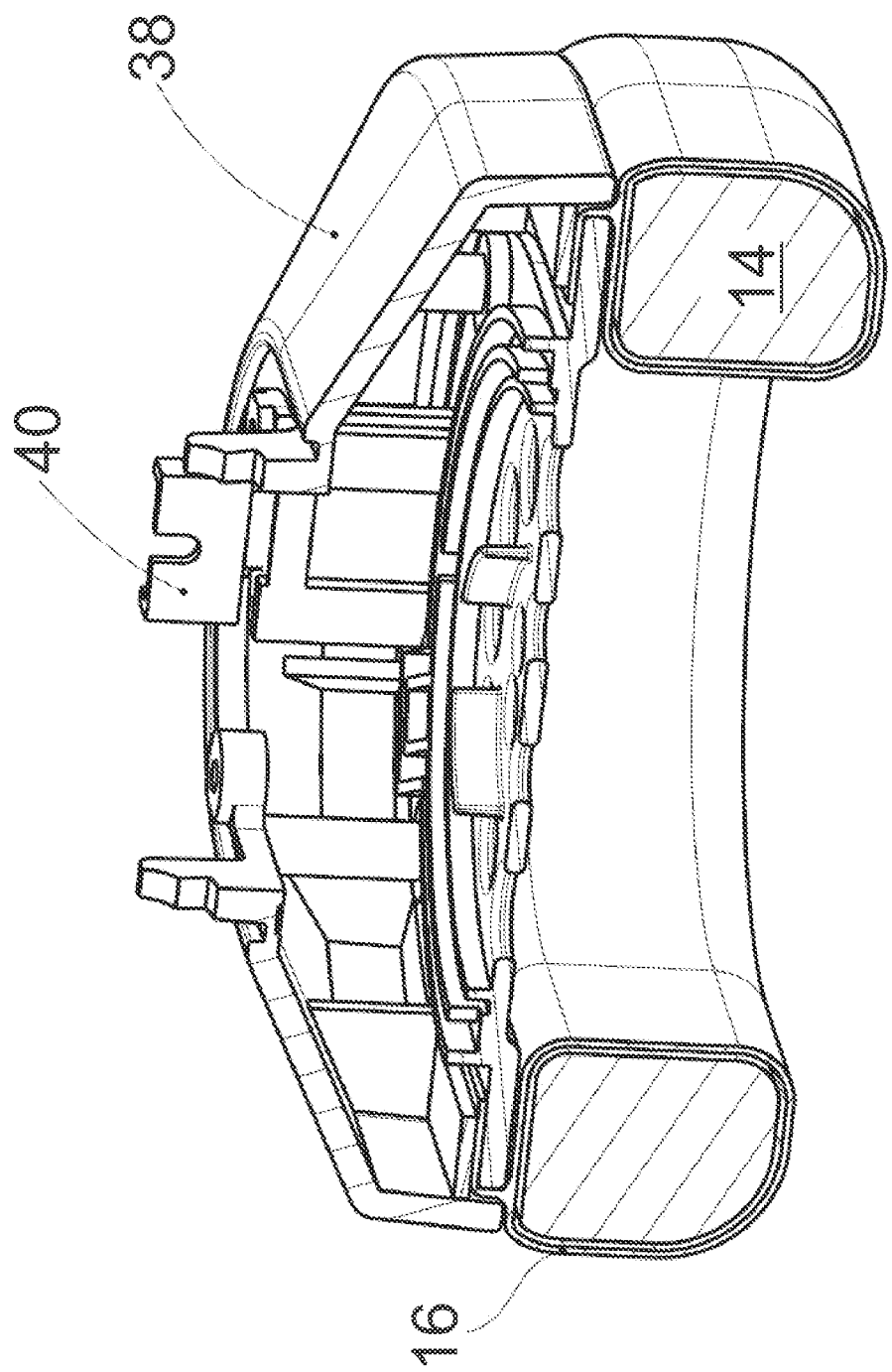
FIG. 4 is a sectional view of the ear cushion assembly and housing of FIG. 3.

Additionally, mounting plate 24 (as shown in FIG. 5), can preferably define one or more projections 40 extending from the side of mounting plate 24 opposite ear cushion 12, where the projections can be configured to act as a guide when assembling the earpiece (see FIG. 4). For example, earpiece housing 38 can further include a counter structure 42 that is complementary to and cooperatively interacts with projection 40 when the earpiece is assembled, forming a guide for fitting the ear cushion to the earpiece housing. For example, projection 40 can be configured so that when the combination of ear cushion assembly 10 and mounting plate 24 is mounted on, or coupled to, earpiece housing 38, earpiece housing 38 will be guided into a desired position in cooperation with the corresponding and complementary counter structure 42. For example, and as shown in FIG. 2, as earpiece housing 38 is coupled to mounting plate 24, counter structure 42 can be urged into the undercut of projection 40, enabling easy and precise positioning of the earpiece housing. Projection 40 can optionally be made to extend sufficiently far that it can be helpful for the assembly and/or positioning of a transducer, or its housing, and may possibly also facilitate the attachment of an outer housing, which may be particularly advantageous, and which can permit the outer housing to be used with other ear cushions.

FIG. 2 depicts the initial disposition of ear cushion assembly 10 and earpiece housing 38 prior to the placement of ear cushion assembly 10 onto earpiece housing 38. Only those parts essential to an understanding of the invention are shown. As shown in FIG. 2, ear cushion assembly 10 includes a seal 44, where seal 44 is shaped and disposed so that it will make contact with both annular sealing surface 18 and with counter-sealing surface 28. Alternatively, or instead of counter-sealing surface 28, an alternative or additional counter-sealing surface 48 can be provided on the end (or outer) surface of earpiece housing 38.

Counter-sealing surface 28 of earpiece housing 38 may be substantially planar, and orthogonal to axis 26. Alternatively, counter-sealing surface 28 can be substantially cylindrical or conical. The face or inner surface of earpiece housing 38 disposed adjacent to counter-sealing surface 28 can also be used as an (additional) counter-sealing surface, which then presses against the outer edge of annular flap 20, and/or the incline of the ear cushion assembly 10 seals.

Figure 3:
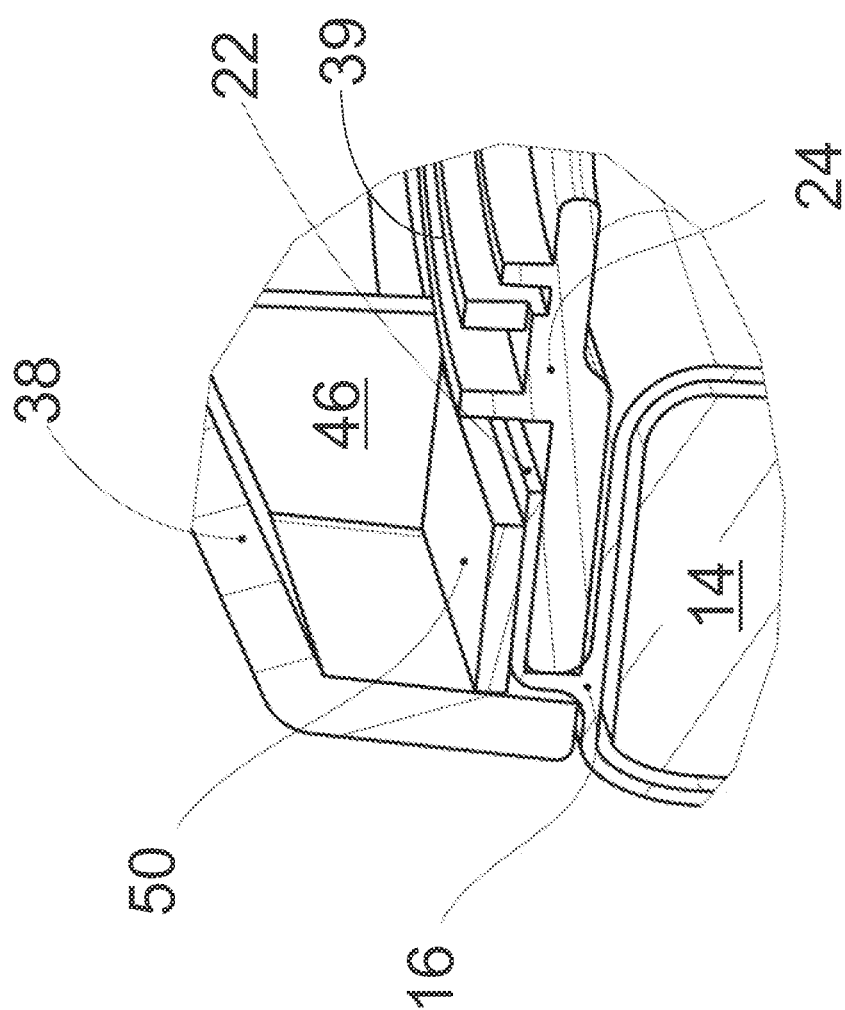
FIG. 3 is a sectional view depicting the details of the sealing of an alternative and exemplary ear cushion assembly on a housing of an earpiece without the use of a sealing ring.

FIG. 3 shows in enlarged detail the assembled configuration of an alternative embodiment of the earpiece in which an inwardly protruding flange 50 is provided instead of seal 44 as shown in FIG. 2: In this embodiment flange 50 forms counter-sealing surface 28 on a side facing ear cushion assembly 10. The inward-facing periphery of sealing surface 18 is formed by ear cushion cover 16 with seam 22 exposed, and therefore does not interfere with sealing ear cushion assembly 10 to earpiece housing 38. The reinforcing ridges 39 of mounting plate 24 are clearly visible. An entire exemplary earpiece including the alternative configuration of FIG. 3 is shown in FIG. 4.

Earpiece housing 38 can additionally include one or more internal features that increase the mechanical strength of the housing and/or reinforce the seal between earpiece housing 38 and ear cushion assembly 10. These internal features may have any suitable configuration, such as for example one or more internal ribs 46. For example, and as shown in FIG. 3, upon assembly of the earpiece, seal 44 is urged against annular sealing surface 18 by internal ribs 46 of earpiece housing 38.

It will be clear to a professional with knowledge of this technology that if the sealing surface is arranged differently than defining a plane which runs normal to axis 26, as indicated above, contact can be provided in the cylindrical/conical area of ear cushion cover 16, as shown in FIG. 3, roughly where the lead line of the reference number 26 ends. Since the relative movement and the resulting force of the screws when tightening at least acts in the approximate direction of axis 26 during assembly (also determined by projection 40 achieved by means of the projection), a seal formed in this area and with contact along circumferential lines (i.e. along an outer surface of a cylinder/cone) cannot be created as easily and reliably as with a contact surface 18 that includes at least one component that is normal to axis 26. With the present disclosure, and their knowledge of this technology, a professional can easily decide whether there is additional, or mainly axial, sealing contact between the annular end face of the earpiece housing 38 and the ear cushion assembly 10.

FIG. 5 shows a perspective view of ear cushion assembly 10 by itself; it also shows fastener openings 32 together with screws 36 drawn in a slightly exploded position, as well as the acoustic openings 30 for the passage of sound from a transducer to the headphone user.

Example 1

Ear cushion assembly 10 for the earpiece of a headphone surrounds mounting plate 24, which includes acoustic openings 30 for the passage of sound and fastener openings 32 on its outer circumference, with annular flap 20 made of leather, synthetic leather, or other suitable outer material, thus forming the connection of mounting plate 24 to earpiece housing 38 in this area by means of the screws 36, and thereby creating an annular, circumferential, solid and airtight sealing surface 18 due to the pressure upon counter-sealing surface 28. As already described above, this connection is only completely airtight at the time of assembly, with subsequent changes being acoustically insignificant, as is also described above.

Example 2

Ear cushion assembly 10 for the earpiece of a headphone is prepared by foaming the ear cushion onto mounting plate 24, which includes acoustic openings 30 for the passage of sound and fastener openings 32 on its outer circumference, using a foaming plastic that forms an intrinsic skin or ear cushion cover 16. This foaming process can be done, for example, by means of a specially provided mold corresponds to the desired end shape of the ear cushion. As a result, an annular, circumferential, solid and airtight sealing surface 18 can be formed in this area, which is reinforced by screwing mounting plate 24 to earpiece housing 38 by means of screws 36, and by the pressure applied to counter-sealing surface 28. As already described above, this connection is only completely airtight at the time of assembly, with subsequent changes being acoustically insignificant, as is also described above.

Example 3

Ear cushion assembly 10 for the earpiece of a headphone surrounds the mounting plate 24, which includes acoustic openings 30 for the passage of sound and fastener openings 32, and with annular flap 20 made of leather along its outer circumference, or some other suitable outer material, thus forming the connection of mounting plate 24 to earpiece housing 38 in this area by means of screws 36, and creating an annular, circumferential, solid and airtight sealing surface 18 due to the pressure upon counter-sealing surface 28.

To provide more precise guidance and a resulting improved accuracy of fit, projection 40 may be provided ensuring positional accuracy in a form-fitting manner. As already described above, this connection is only completely airtight at the time of assembly, with subsequent changes being acoustically insignificant, as is also described above.

The earpieces of the present disclosure can be modified in various ways, such that the acoustic openings 30 for the passage of sound can have a different shape, size and/or arrangement in mounting plate 24; there could be more or less than four fasteners 34 (such as screws 36, among others), where a minimum of two and a maximum of six, or at most eight, is regarded as a reasonable range; mounting plate 24 does not have to be flat, but could be curved and/or conical in shape; the alignment of the fastener axes can deviate from alignment with the direction of axis 26 within certain limits. In the examples shown, projection 40 protrudes deep into earpiece housing 38 and is used not only for the assembly and positioning of the ear cushion assembly 10, but also for a transducer and/or its housing part, but this does not have to be the case. For reasons of cost, for example, a plurality of very low guides can be provided which enable inexpensive molds that are also easy to demold.

It should be evident that projection 40 can also be configured for use with other headphone shells, completely independently of the design of ear cushion assembly 10. Only the counter structures 42 in earpiece housing 38 are required for this. As mentioned, these guides can also be used for positioning a capsule or a capsule housing.

The invention can be modified in various ways, such that annular flap 20 can have a different shape than that shown, particularly if sealing surface 18 is arranged on the edge of the ear cushion 12; and projection 40 and counter structure 42 can assume a wide variety of shapes and positions, as can seal 44.

Any materials that typically are used in the construction of earpieces and/or headphones may be used in the present disclosure, and such materials do not require any explanation; as is also true for the various dimensions of the components of the present disclosure.

Example 4

This section describes additional aspects and features of the disclosed ear cushion, earpiece, and headphones presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A cushion for the shell of a headphone, characterized in that the cushion (12) is connected to a mounting plate (24) which has openings (30) for the passage of sound and screw holes (32), in that the cushion (12) grips around the outer circumference of the mounting plate (24) and forms an annular, circumferentially fixed and airtight sealing surface (18) in this area.

A2. The cushion according to paragraph A1, characterized in that it has a padding (14) and a cover (16), and in that an annular flap (20) of the cover (16) is folded inwardly around the mounting plate (24).

A3. The cushion according to paragraph A1 or A2, characterized in that the cover (16) consists of leather or synthetic leather and is sewn, and that the seam is provided on the outermost edge of the annular flap (20).

A4. The cushion according to one of paragraphs 1 to 3, characterized in that the cushion material is foam-filled into the cover (16).

A5. The cushion according to paragraph A1, characterized in that it is foam-filled onto the mounting plate (24) while forming the sealing surface (18).

A6. The cushion according to one of paragraphs 1 to 5, characterized in that the mounting plate (24) has at least one protrusion as a guide (40).

A7. The cushion according to one of paragraphs 1 to 6, characterized in that the mounting plate (24) has ridges, reinforcements and the like to increase the mechanical strength.

A8. A headphone with at least one cushion (12) according to paragraph A1, with a housing (38) and a cushion (12), characterized in that the cushion (12) is connected to a mounting plate (24), which has openings (30) for the passage of sound and screw holes (32), in that the cushion (12) grips around the outer circumference of the mounting plate (24) and forms an annular circumferential sealing surface (18) in this area, and that a counter-sealing surface (28) is formed on the housing (38) or a circumferential, annular seal (44), and that the cushion (12) is connected to the housing by means of at least one screw (36) which protrudes through the screw holes (32) and is screwed into internal threads of the housing (38).

A9. The headphone according to paragraph A8, characterized in that the cushion (12) has a padding (14) and a cover (16) and that an annular flap (20) of the cover (16) is folded inwards around the mounting plate (24).

A10. The headphone according to paragraph A9, characterized in that the cover (16) consists of leather or synthetic leather and is sewn, and that the seam is provided on the outermost edge of the annular flap (20).

A11. The headphone according to paragraph A9 or A10, characterized in that the outermost edge of the annular flap (20), possibly the seam, is positioned within the sealing surface (18) of the cushion when assembled.

A12. The headphone according to one of paragraphs A9 to A11, characterized in that the cushion is foam-filled into the cover (16).

A13. The headphone according to paragraph A8, characterized in that it is foam-filled onto the mounting plate (24) while forming the sealing surface (18).

A14. The headphone according to one of paragraphs A8 to A13, characterized in that the mounting plate (24) has at least one protrusion as a guide (40), and the housing (38) has at least one recess which is complementary in its shape and which together form a guide when the cushion (12) is fitted to the housing (38).

A15. The headphone according to paragraph A14, characterized in that the protrusion (40) protrudes further from the mounting plate (24) than the housing (38) in this area and that it serves as a positioning element for a transducer or its housing.

A16. The headphone according to one of the preceding paragraphs, characterized in that the mounting plate (24) has ridges, reinforcements and the like to increase the mechanical strength, which, if necessary, make positive contact with protrusions and/or recesses in the housing (38) in a form-fitting manner.

Relative terms such as "lower part" in the description and the claims, for example a suspension, reactor, filter, structure, or a device or an object in general, the lower half—and particularly the lower quarter—of the total height means "lowest area" or the lowest quarter (particularly any fraction smaller than this); while "middle area" means the middle third of the total height (width—length). All this information has its common meaning, applied to the intended position of the object under consideration.

In the description and claims, "essentially" means a deviation of up to 10% of the specified value, if it is physically possible, both downwards and upwards, or otherwise only in the sensible direction; for degrees (angles and temperature), this means ±10°.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

Terms such as "first," "second," and "third" are used to distinguish or identify various members of a group, or the like, and are not intended to show serial or numerical limitation.

All quantities and proportions, particularly those delimiting the disclosure, unless they relate to the specific examples, are to be understood with a tolerance of ±10%, for example: 11% means: from 9.9% to 12.1%. For terms such as "a solvent", the word "a" should not be seen as a numerical word, but as an indefinite article or as a pronoun, unless the context indicates otherwise.

The term "combination" or "combinations", unless otherwise stated, describes all types of combinations, starting from two of the constituents in question up to a large number or all of such constituents.

Similarly, terms such as "comprising," "including," "having," and "containing" (and conjugations thereof) are used interchangeably to mean including but not necessarily limited to, and are open-ended terms not intended to exclude additional, unrecited elements or method steps.

The features and variants specified in the individual configurations and examples can be freely combined with those of the other examples and configurations, and can particularly be used to characterize the invention in the claims without necessarily including the other details of the respective configuration or the respective example.

Conclusion

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

REFERENCE NUMBERS

10 Ear cushion assembly
12 Ear cushion
14 Ear cushion padding
16 Ear cushion cover
18 Annular sealing surface
20 Annular flap
22 Seam
24 Mounting plate
26 Axis
28 Counter-sealing surface
30 Acoustic openings in mounting plate
32 Fastener openings in mounting plate
34 Fasteners
36 Screws
38 Earpiece housing
39 Reinforcing ridges
40 Projection (guide)
42 Counter structure
44 Seal
46 Internal ribs
48 Alternative/additional sealing surface
50 Flange

What is claimed is:

1. An ear cushion assembly for an earpiece housing of a headphone, comprising:
    an annular counter-sealing surface of the earpiece housing; and
    an ear cushion coupled to a mounting plate, where the mounting plate defines plural openings for a passage of sound, and plural openings for fasteners; where the mounting plate further includes one or more annular reinforcing ridges that increase a mechanical strength of the mounting plate, the annular reinforcing ridges project toward the earpiece housing, and the annular reinforcing ridges are configured to make positive contact with one or more corresponding projections and/or one or more counter structures in the earpiece housing in a form-fitting manner;
    wherein the ear cushion grips an outer circumference of the mounting plate to form an annular sealing surface that is clamped between the annular counter-sealing surface of the earpiece housing and the outer circumference of the mounting plate to form a circumferentially-fixed, and substantially airtight seal.

2. The ear cushion assembly of claim 1, wherein the ear cushion further includes a cushion filling and a cushion cover; and the cushion cover further includes an annular flap that is folded inwardly and around the mounting plate.

3. The ear cushion assembly of claim 2, wherein the ear cushion cover includes leather or synthetic leather and is sewn in such a way that a seam is provided at an innermost edge of the annular flap.

4. The ear cushion assembly of claim 1, wherein the ear cushion filling is foam-filled into the ear cushion cover.

5. The ear cushion assembly of claim 1, wherein the ear cushion filling is foam-filled onto the mounting plate, thereby forming the sealing surface.

6. The ear cushion assembly of claim 1, wherein the mounting plate further includes at least one projection configured to act as a guide for earpiece assembly.

7. A headphone having an earpiece, the earpiece comprising:
    an ear cushion assembly, including an ear cushion coupled to a mounting plate where the mounting plate defines openings for a passage of sound, and openings for screws;
    wherein the ear cushion grips an outer circumference of the mounting plate with an annular sealing surface; and
    an earpiece housing, including a counter-sealing surface formed on the earpiece housing;
    wherein the sealing surface of the ear cushion is clamped between the annular counter-sealing surface of the earpiece housing and the outer circumference of the mounting plate to form an annular circumferentially fixed, and substantially airtight seal;
    wherein the mounting plate further includes one or more annular reinforcing ridges that increase a mechanical strength of the mounting plate, where the annular reinforcing ridges project toward the earpiece housing and make positive contact with one or more corresponding projections and/or one or more counter structures in the earpiece housing in a form-fitting manner; and
    wherein the ear cushion is connected to the earpiece housing by means of at least one screw that extends through a screw opening and is screwed into an internal threading of the earpiece housing.

8. The headphone according to claim 7, wherein the ear cushion includes an ear cushion filling and an ear cushion cover, and the ear cushion cover further includes an annular flap that is folded inwardly and around the mounting plate.

9. The headphone according to claim 8, wherein the ear cushion cover includes leather or synthetic leather and is sewn, and is sewn in such a way that a resulting seam is provided at an innermost edge of the annular flap.

10. The headphone according to claim 9, wherein the innermost edge of the annular flap is positioned within the sealing surface of the ear cushion when assembled.

11. The headphone according to claim 8, wherein the ear cushion filling is foam-filled into the ear cushion cover.

12. The headphone according to claim 7, wherein the ear cushion filling is foam-filled onto the mounting plate, thereby forming the sealing surface.

13. The headphone according to claim 7, wherein the mounting plate further includes at least one projection, and the earpiece housing has at least one counter structure that is complementary in its shape to the projection, such that the projection and the counter structure interact cooperatively to form a guide for fitting the ear cushion to the earpiece housing.

14. The headphone according to claim 13, wherein the projection protrudes further from the mounting plate than the earpiece housing, the projection additionally serves as a positioning element for a transducer or a transducer housing.

\* \* \* \* \*